May 1, 1956        H. N. BLISS        2,743,843
APPARATUS FOR DISPENSING SELECTED MIXTURES OF TWO LIQUIDS
Filed Aug. 8, 1952        3 Sheets-Sheet 1

INVENTOR.
HARVEY N. BLISS
BY
Lindsey and Prutzman
ATTORNEYS

May 1, 1956   H. N. BLISS   2,743,843
APPARATUS FOR DISPENSING SELECTED MIXTURES OF TWO LIQUIDS
Filed Aug. 8, 1952   3 Sheets-Sheet 2

INVENTOR.
HARVEY N. BLISS
BY
Lindsey and Prutzman
ATTORNEYS

May 1, 1956  H. N. BLISS  2,743,843
APPARATUS FOR DISPENSING SELECTED MIXTURES OF TWO LIQUIDS
Filed Aug. 8, 1952  3 Sheets-Sheet 3
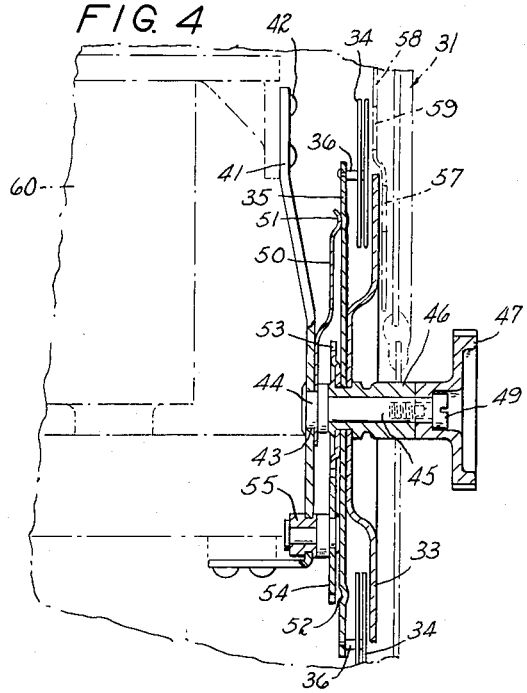
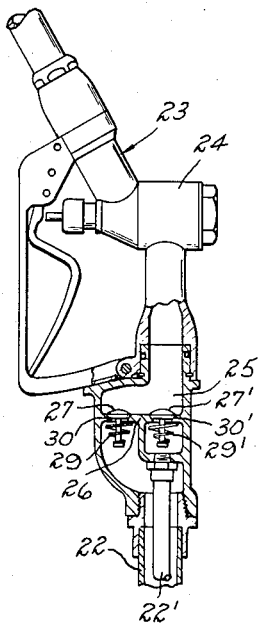
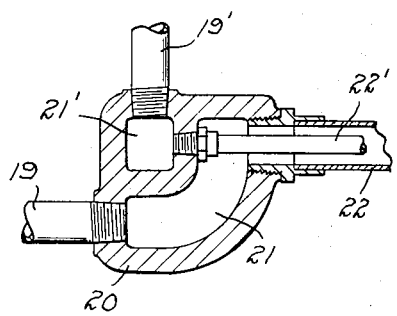
INVENTOR.
HARVEY N. BLISS
BY
Lindsey and Prutzman
ATTORNEYS

United States Patent Office 2,743,843
Patented May 1, 1956

2,743,843

APPARATUS FOR DISPENSING SELECTED MIXTURES OF TWO LIQUIDS

Harvey N. Bliss, Windsor, Conn., assignor to Veeder-Root Incorporated, Hartford, Conn., a corporation of Connecticut Application August 8, 1952, Serial No. 303,349

7 Claims. (Cl. 222—26)

This invention relates to liquid dispensing apparatus and pertains more particularly to apparatus of this character for dispensing a selected mixture of two different liquids, as for example, gasolines of different octane ratings.

One object of the invention is to provide dispensing apparatus which will indicate both the cost and quantity of the liquid aggregate dispensed.

Another object of the invention is to provide apparatus in which the indication of the cost of the liquid mixture dispensed will be absolutely accurate and directly related to the exact quantities of each compound liquid dispensed so that it is assured that the customer will pay only for what he actually receives.

Another object of the invention is to provide apparatus that will show the price per unit of each individual liquid to be mixed, and also the cost of the delivered aggregate or mixture.

Another object of the invention is to provide dispensing apparatus of the above type particularly suited for dispensing gasolines having different octane ratings in which the octane rating of a desired mixture will be displayed along with the unit price thereof.

A further object of the invention is to provide apparatus that will be inexpensive, accurate, sturdy, and easily adjusted to reflect various price changes.

A still further object of the invention is to automatically and cumulatively register the total quantities of the individual liquids to be mixed, together with their respective costs.

Further, another object of the invention is to prevent flow from one line into the other line when large quantities of one liquid are being dispensed, thereby precluding contamination of the second line with fluid from the first line under these flow conditions.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 4 is a sectional view through the center of the octane selector, and its associated mechanism, other portions of the apparatus being shown in phantom outline.

Figure 5 is a view of the delivery nozzle, a portion thereof being shown in section; and, Figure 6 is a sectional detail of a coupling illustrating the manner of connecting two delivery hoses thereto.

Figure 1:
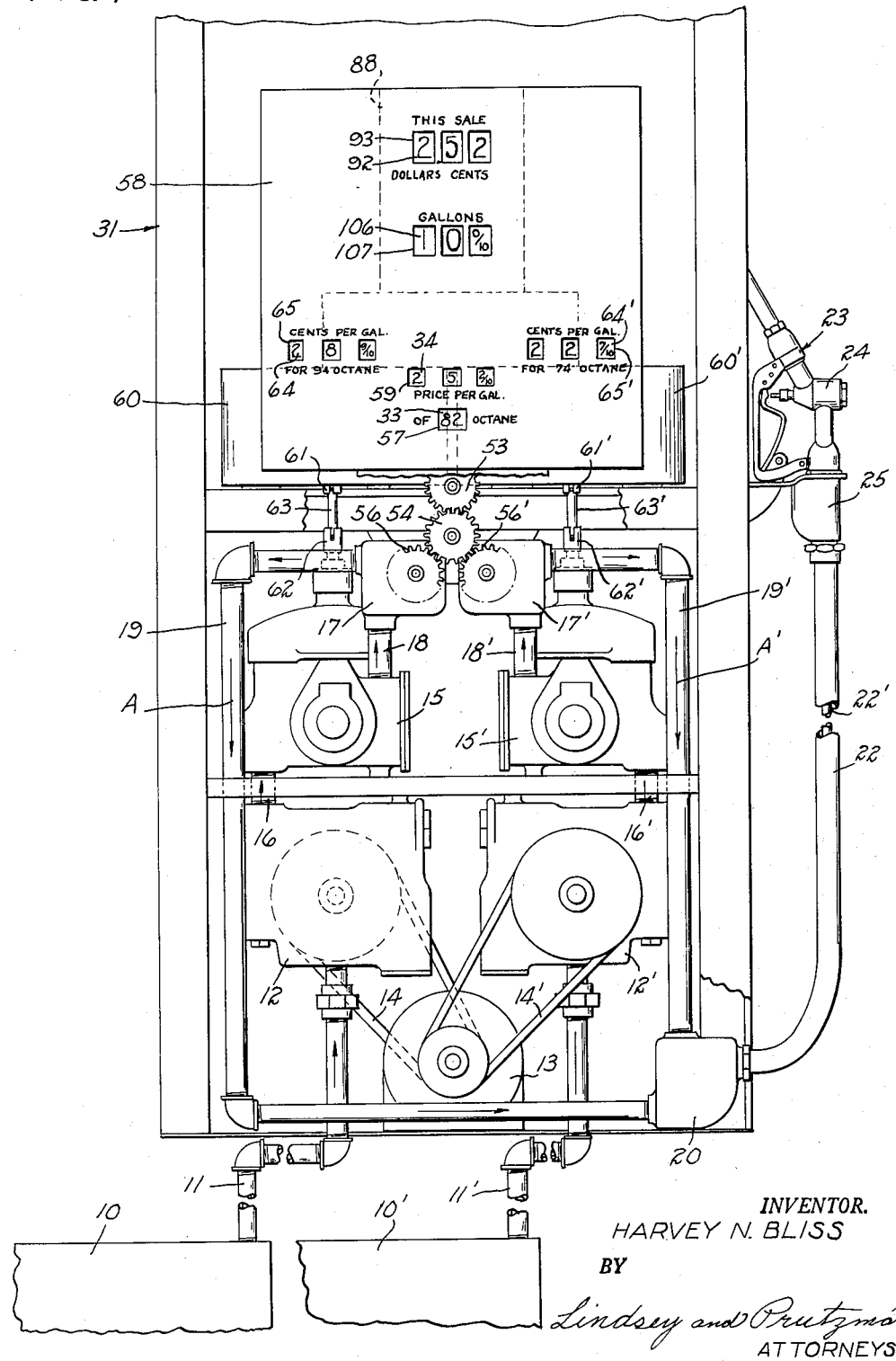
Figure 1 is an elevational view of the apparatus, a portion of the housing being removed to illustrate the normally concealed elements constituting the apparatus.
Figure 2:
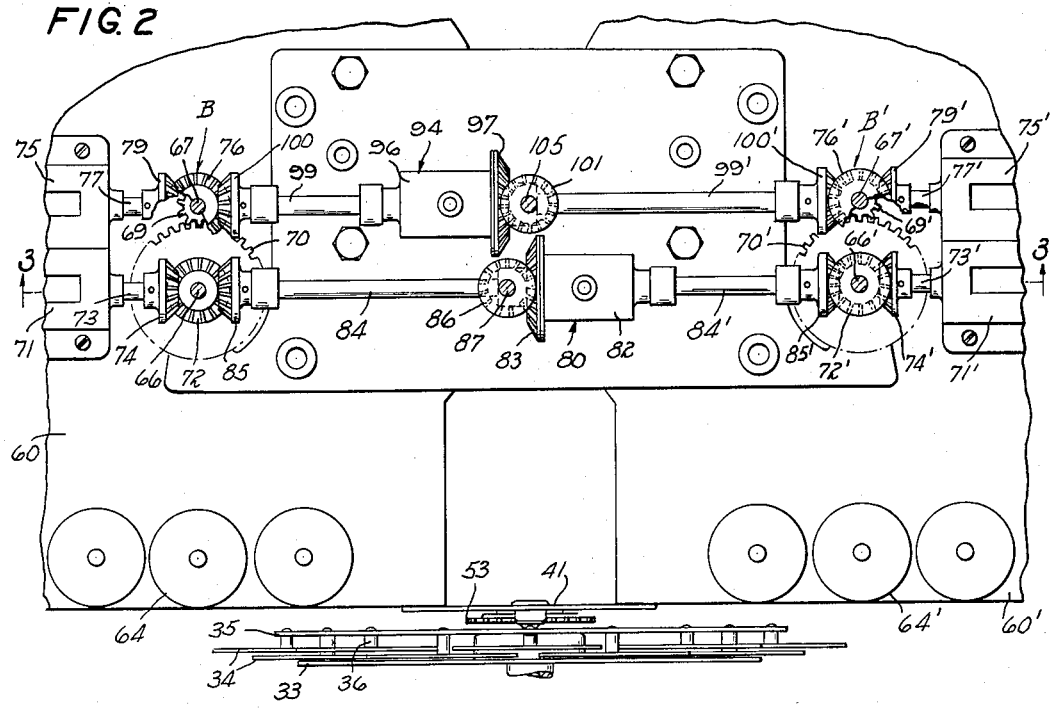
Figure 2 is a plan view of the apparatus taken in the direction of line 2—2 of Figure 3.

Before referring to the drawings, it should be explained that the invention will be described, for the sake of simplicity, by using in addition to the usual reference numerals, duplicate numerals with prime marks added thereto designating parts performing the same function.

Further, since my dispensing apparatus is especially suited for the mixing or blending of two gasolines of different octane ratings into a single aggregate or mixture having a preferred octane rating, the following description will be restricted to mechanical parts and indicia for achieving this specific purpose, although it is to be understood that the assemblage so described is not limited to use with the specific liquids mentioned by way of illustration.

Considering first the apparatus visible in Figure 1, two independent flow lines form an essential part of the apparatus there shown, one of these flow lines bearing the letter A and the other the letter A'. Each flow line A, A' includes a storage tank 10, 10' from which two gasolines having different octane ratings, later specifically exemplified, are withdrawn by way of suction pipes 11, 11', these suction pipes having connection with a pair of pumps 12, 12', which pumps may be driven by a single motor 13 and a pair of belts 14, 14'. Disposed above the pumps are meters 15, 15' receiving the discharge from the pumps 12, 12' by way of pipes 16, 16'. Above the meters 15, 15' is positioned a pair of valves 17, 17', connection being made to these valves by way of pipes 18, 18'. The outlets from the valves 17, 17' have attached thereto pipes 19, 19' which lead to a coupling 20 containing a pair of passages 21, 21'.

Having communication with the passages 21, 21' is a pair of concentrically arranged hoses 22, 22' provided with a nozzle, generally designated by the numeral 23 affixed to their far ends. A shut-off valve 24 is incorporated into the nozzle, as in conventional nozzles of this general character, but the nozzle 23 differs from customary nozzles in that a mixing chamber 25 is provided as an integral part thereof, the mixing chamber having a partition wall 26. Inasmuch as the hoses 22, 22' are intended to carry different liquids, it is extremely desirable that when one hose is carrying a large volume of fluid that there be no flow from that line back into the other line. Accordingly, a pair of poppet valves 27, 27' is utilized, these valves each having a spring 29, 29' which forces the valves against a pair of valve seats 30, 30' provided in the wall 26. Inasmuch as these valves are normally urged into a closed position, it will be apparent that when one hose, either 22 or 22' is carrying a large flow of liquid, the valve in that particular line will be urged open by the liquid pressure produced by the pump in that line, and any tendency for the liquid to enter the other hose via the other poppet valve will be precluded.

As is usual with dispensing apparatus of this description, the various parts other than the tanks 10, 10' are encased within a suitable housing generally identified by the reference numeral 31.

Figure 3:
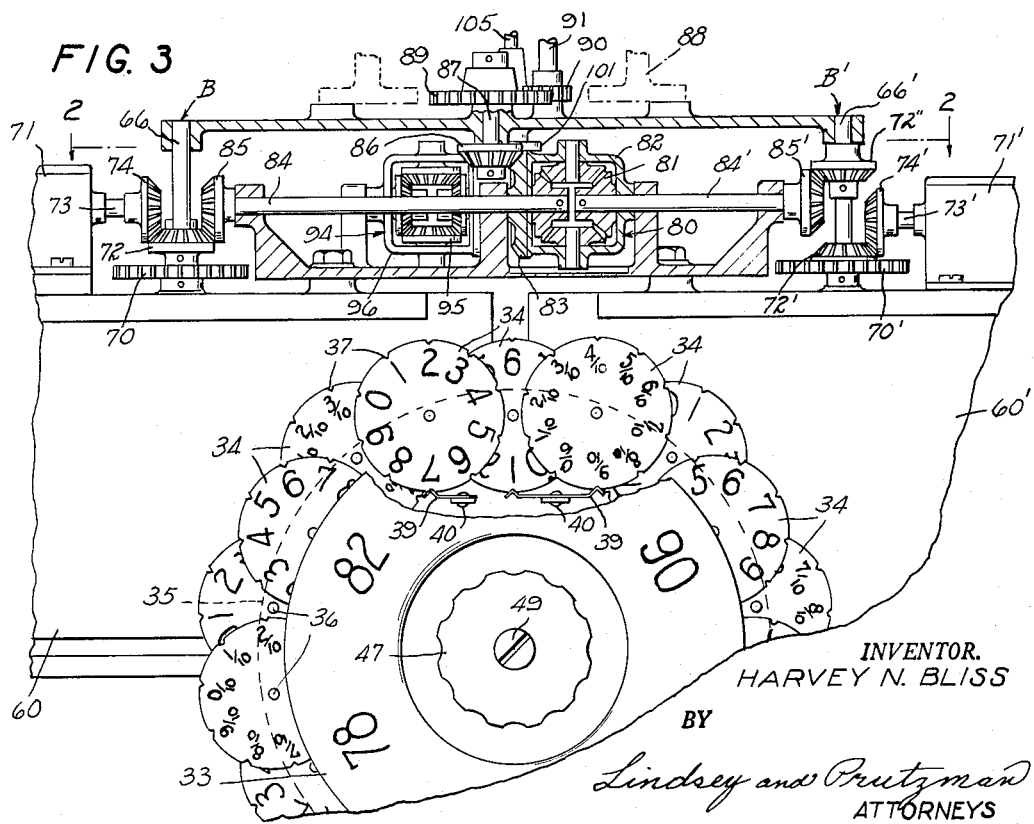
Figure 3 is a sectional view taken in the direction of line 3—3 of Figure 2.

Continuing with the description and assuming that octane ratings of "74" and "94" might be desired, the tank 10 may be used as the storage means for the "94" octane gasoline, whereas the storage tank 10' may be used to store the "74" octane gasoline. In order to provide an octane rating intermediate these two suggested extremes, a manual octane selector dial 33 is employed as will best been seen from an inspection of the Figure 3. This octane selector will, therefore, have indicia inscribed therearound in preferred octane increments. Practical increments have been found to reside in the employment of numerals specifying octane differences of four for the particular octane ratings above mentioned, so the selector 33 would accordingly carry numerals reading "74," "78," "82," "86," "90," and "94."

A series of individually manually adjustable price dials 34 is carried about the periphery of a supporting plate 35 which is fixed to selector dial 33 for rotation therewith, these price dials 34 being mounted for individual manual rotation relative to the supporting plate by means of a plurality of pins 36. Since these price dials 34 are to remain in a particular angular position until a change in price is to be made, provision for releasably holding the dials in a preferred or selected angular position is made, there being a number of notches 37 disposed around the periphery of each dial 34 which notches are cooperable with a plurality of spring detents 39 carried by the supporting plate 35 at spaced locations thereabout. These spring detents are suitably attached to the supporting plate 35 by means of a number of rivets 40.

A bracket 41 anchored to the housing 31 by a group of rivets 42, as shown in Figure 4, serves as a bearing member for the octane selector dial 33 and for the supporting plate 35 on which are mounted the price dials 34. To provide the requisite rotative support for these elements, bracket 41 has an aperture 43 in which is mounted a circumferentially grooved collar 44. Integral with the collar 44 is a shaft 45 having a bushing 46 circumposed thereabout, the octane selector diad 33 and the suporting plate 35 being fixedly positioned on said bushing 46. In order to permit the manual turning of the octane selector 33 and the supporting plate 35 with the price dials 34 thereon, a manual control knob 47 is fixedly positioned relative to the bushing 46 by means of a screw 49. The supporting plate 35 is maintained in a selected rotated position by a spring detent 50 anchored relative to the fixed bracket 41, the spring detent 50 having an arcuate end 51 which is engageable in any one of a number of depressions 52 formed in the supporting plate 35.

Also rotatable with the bushing 46 is a spur gear 53 which meshes with an idler gear 54. The idler gear 54 is rotatably supported on the lower end of the bracket 41 by means of a collar 55. A gear 56, 56' is operatively associated with each valve 17, 17' so when the konb 47 is turned to obtain the desired octane rating, the gears 56, 56' will be rotated a predetermined amount, which amount is governed by the particular selection made with the octane selector 33. In this way, the passage of the gasoline because of the mechanical drive connection between said selector and the valves through either flow line A or A' is accurately controlled, such control being in correspondence with the particular octane rating required. In order that the aggregate octane rating may be easily observed by the purchaser, a viewing window 57 is disposed in a face panel 58 confronting the selector 33. Similarly, a series of windows 59 permit the observation of the price dials 34, each of which price dials is prearranged manually so as to indicate the particular price of the mixed gasoline per gallon for the particular octane rating with which it is associated. Thus, it will be seen that the dials 34, once having been properly manually set, will indicate the price to be paid by the purchaser per volumetric unit for the particular octane gasoline that he has ordered.

Up to this point, reference has been made only to the flow lines A and A', together with the octane selector and its associated price indicator for determining the relative amount of each gasoline which is permitted to flow through these lines and the unit price of the mixture. However, it is desired that the cost of the mixed gasoline be indicated to the purchaser along with the total quantity purchased and therefore, it is within the contemplation of the invention to provide computing mechanisms for registering both the cost and the volume of the aggregate dispensed. These computing mechanisms have been given the identifying letters B and B', the same system of priming being used in the ensuing description as was used in describing the flow lines A and A'.

To accomplish the above computation, a pair of variators 60, 60' is utilized. These variators may be of known construction, one such construction which is perfectly satisfactory being that described in U. S. Patent 2,111,996, issued March 22, 1938 to Edward A. Slye. Such variators are conventionally equipped with drive shafts 61, 61' which are connected to and driven by meter shafts 62, 62' by virtue of universal couplings 63, 63'. It will, of course, be understood that the meter shafts 62, 62' rotate in such a manner as to indicate the volume of liquid passing through each of the meters, the revolutions of which shafts are proportional to the volume measured by the particular meter of which the shaft is a part.

The variators 60, 60' are also conventionally provided with manually settable price indicator wheels, here shown as wheels 64, 64', which may be viewed through the windows 65, 65' in panel 58, and indicate the particular settings of the variators 60, 60' which correspond to the particular respective prices per gallon of the two gasolines stored in the tanks 10, 10'. A money shaft 66, 66' is driven by each variator 60, 60', and additionally each variator drives a gallonage shaft 67, 67'. The gallonage shafts may be a direct continuation of the shafts 61, 61', which arrangement is depicted in the above identified patent (U. S. Patent 2,111,996). The money shafts 66, 66', on the other hand, are driven by gears 70, 70' connected through pinion sleeves 69, 69' and the usual speed change gearing within the variators which produces a rotation proportional to the rotation of gallonage shafts 67, 67', the proportion varying with the setting of the price indicator wheels 64, 64'.

In order to produce a record of each type of gasoline dispensed, the invention envisages the employment of a pair of money totalizers 71, 71'. In order to drive the money totalizers 71, 71' there are employed bevelled gears 72, 72' fixed to the money shafts 66, 66' and connected through gears 74, 74' to shafts 73, 73' extending from each money totalizer 71, 71'. A pair of gallonage totalizers 75, 75' are similarly driven by a pair of bevelled gears 76, 76' carried on the gallonage shafts 67, 67'. Each gallonage totalizer has extending therefrom a shaft 77, 77' and carried at the remote ends of these shafts are bevelled gears 79, 79' which mesh with the bevelled gears 76, 76'; thus, it will be seen the money totalizers 71, 71' have direct mechanical connection with the money shafts 66, 66' which are in turn driven directly from the variators 60, 60', whereas the gallonage totalizers 75, 75' have direct mechanical connection with the gallonage shafts 67, 67'.

In order to register the total cost of each transaction, a differential 80 is utilized to totalize the rotation of money shafts 66, 66', the differential including a set of input bevelled gears 81, a cage 82, and a bevelled output gear 83 integral with the cage. The differential 80 is driven by horizontal shafts 84, 84' having bevelled gears 85, 85' thereon, these bevelled gears meshing with bevelled gears 72 and 72', the latter being rotatable with the shafts 66 and 66'. The bevelled output gear 83, this being the one integral with the cage 82, is in mesh with a bevelled gear 86 rotatable with an upright stub shaft 87. Surmounted on the stub shaft is a spur gear 89 which is in mesh with a pinion 90. The pinion 90 is located at the lower end of a cost shaft 91, which drives a register 88, shown in dotted outline in Figure 1 as disposed in the upper region of the housing 31. Register 88 may be of known construction, corresponding, for example, to that described in U. S. Patent 2,264,557, granted December 2, 1941, to Edward A. Slye. Included in such a register 88 is a plurality of cost or money wheels, here shown as wheels 92, visible through windows 93 in the panel 58, on which is displayed the total cost of liquid dispensed. Thus, irrespective of the amount of gasoline being pumped from either tank 10 or 10' the cost of the mixture dispensed from the nozzle 23 will be registered by the cost indicator wheels 92 for any given transaction.

Similar to the differential 80 is a differential 94 for totalizing the rotation of gallonage shafts 67, 67', and thus in totaling the volume of mixed gasoline dispensed during each transaction. The gallonage differential 94 comprises a set of input bevelled gears 95, a cage 96, and an output bevelled gear 97 integral with the cage. Corresponding to the shafts 84, 84', the differential 94 has connected thereto a pair of horizontal shafts 99, 99' for driving this last mentioned differential, these horizontal shafts carrying bevelled gears 100, 100' which mesh with the gears 76, 76' affixed to the shafts 67, 67'. A bevelled gear 101 is driven by the bevelled gear 97 integral with the differential housing 96. The bevelled gear 101 is rotatably secured to the drive shaft 105 of a conventional gallonage counter included in register 88, and having gallonage indicator wheels 106 visible through viewing windows 107 in the panel 58.

From the above description, it will be seen that the money wheels 92, together with the gallonage wheels 106 are included in the registering means 88 for indicating to the purchaser both the cost of the gasoline dispensed and the volume thereof. While the cost wheels 92 and the gallonage wheels 106 display figures based on the mixed gasoline delivered via the nozzle 23, it will be noted that the money totalizers 71 and 71', along with the gallonage totalizers 75 and 75' separately record the totals of each gasoline withdrawn from the tanks 10 and 10'. These latter totalizers, of course, permit ready checking at any time by the management of an establishmetn in order to ascertain the amount of gasoline withdrawn from either tank 10 or 10' and, also, show the amount of money that should have been received for the withdrawn gasoline. Stated otherwise, the money wheels 92 and the gallonage wheels 106 record only the cost and quantity totals for a particular transaction, these counters being returned to their zero setting for the next transaction by the usual manual reset provided in a register 88 of the type shown in the above-mentioned Slye Patent No. 2,264,557, whereas the totalizers 71, 71', 75 and 75' total the respective cost and quantity for a large number of transactions, these totalizers usually having locking means to prevent unauthorized tampering therewith.

The operation of my apparatus will be apparent from the foregoing description taken together with the following specific explanation. Assuming that the "94" octane gasoline has been placed in tank 10 and "74" octane gasoline in tank 10', the manual octane selector 33 permits ready dispensing of a combined mixture of these two gasolines having any octane rating between 74 and 94 which is desired by the customer. More specifically, the octane rating as obtained from a setting of the octane selector in the present instance involves the attainment of a mixed gasoline having an octane rating of "74," "78," "82," "86," "90," or "94." Octane ratings in multiples of four have been illustrated as a typical range of ratings along with a practical incremental difference between each octane rating. One reason for limiting the number of octane ratings that can be selected is that it is most desirable to display the price per gallon for each selected octane and, inasmuch as three of the dials 34 are required to display any one octane price, it can readily be seen that to avoid excessive size of the octane selector 33 and supporting plate 35 on which the various price dials 34 are mounted, only a limited number of price dials 34 may be used. Further, from actual experience, it has been determined that a smaller difference than four octane units is usually of no practical significance, an engine tuned to operate with an octane rating of say "84" also operating very satisfactorily with an octane rating of "82" or "86."

The selection of the desired octane by turning the knob 47 until the proper octane number on the selector 33 appears within the opening 57 also brings into view the price per gallon to be paid by the purchaser for gasoline having this particular octane rating. This feature is by virtue of the fact that the individually adjustable price dials 34, which have been previously set for the particular price to be paid per gallon for the various octane ratings that might be selected, are mounted for rotation in unison with the octane selector 33, since the supporting plate 35 for these dials is mechanically connected for rotation with the bushing 46, the octane selector 33 also being mounted for rotation with this bushing. Having selected the desired octane in the above manner, the pump motor 13 is started in the conventional fashion and the shutoff valve 24 is manually opened to permit flow of gasoline from both the tanks 10 and 10', assuming, for instance, that an octane rating such as "82" has been selected lying intermediate the lower and upper octanes "74" and "94," which lower and upper octanes are available in the exemplified situation now being described. If an octane rating of only "74" were desired, then, of course, gasoline would be withdrawn solely from the tank 10', and if gasoline having an octane rating of "94" were selected, then gasoline would be drawn exclusively from the tank 10.

Once the pumps 12 and 12' have been placed in operation and the shutoff valve 24 open so that the nozzle 23 begins dispensing the mixed aggregate, the gasolines from the tanks 10, 10' separately course through the pipes 11, 11', the pumps 12, 12', the meters 15, 15', the valves 17, 17' to the coupling 20 where the two gasolines continue to flow independently of the other through the hoses 22, 22' to the mixing chamber 25 of the nozzle 23 at which situs they are blended or mixed together. By having the mixing action take place within the nozzle 23, rather than, say, at the coupling 20 in which case only a single dispensing hose would be needed, there will be virtually no mixed gasoline left from the previous transaction.

Since the octane selector 33 is mechanically coupled to the valves 17, 17' by virtue of the spur gear 53, the idler gear 54 and the two valve gears 56, 56', it will be appreciated that the valves 17, 17' are positioned in accordance with the particular octane rating appearing within the opening 57. Needless to say, the valve 17 is so arranged relative to the valve 17' that one opens and the other closes, even through the idler gear 54 rotates the gears 56 and 56' in the same direction when the knob 47 is turned, thereby assuring that the amount of flow through the valve 17 is increased as the flow of gasoline through the valve 17' is decreased and vice versa when the knob 47 is oppositely turned. For instance, when an octane rating of 82 is desired, this octane rating falling closer to "74" than "94," the valve 17' will be opened farther than the valve 17 in order that a greater quantity of the "74" octane gasoline will be permitted to flow into the mixing chamber 25 in the nozzle 23 than through the valve 17 into this mixing chamber.

Should an octane rating of "74" be selected, then, of course, the flow will be entirely from the tank 10' with the attendant result that valve 17 will be completely closed when this particular situation arises. The poppet valve 27' will readily open because of the pressure exerted upon it by the "74" octane gasoline, but since no gasoline is being dispensed by way of the line A under these specific assumed conditions, the poppet valve 27, both poppet valves 27, 27' being one-way valves, will remain closed and none of the "74" octane gasoline will be permitted to enter the hose 22. In other words, the poppet valve 27 prevents flow of gasoline from the hose 22' into the hose 22. Conversely, if an octane rating of "94" is selected, then the valve 17' will remain closed and the flow of gasoline through the line A by way of the hose 22 will not be permitted to enter the hose 22' because of the poppet valve 27'. It might be also mentioned at this particular time that even when gasoline is being pumped from both tanks 10 and 10', the flow from one being of less intensity than the flow from the other, the valves 27, 27' will function to prevent flow from one hose into the other thereby avoiding contamination when there is a great difference in the quantities of the two gasolines being dispensed.

By reason of the shafts 62, 62', the revolutions of which are directly proportional to the volume of gasoline being measured by the meters 15, 15', the quantity of gasoline withdrawn from the two tanks 10, 10' is separately recorded or registered on the gallonage totalizers 75, 75'. Similarly, since the variators have internal provision for driving the pinion sleeves 69, 69' in accordance with the price indicated by the wheels 64, 64', the totalizers 71, 71' will record the total amount of money that should have been collected for the gasoline individually dispensed from the two tanks 10, 10'.

Further, by virtue of the differentials 80 and 94, the cost counter wheels 92 and the gallonage counter wheels 106 will respectively record the cost that the purchaser is to pay for the mixed gasoline that he has received and the volume of such gasoline received. The cost indicator 92 and the gallonage indicator 106 will be returned to their zero registrations after each transaction, as hereinbefore mentioned. Should for some reason the selector 33 not indicate the true octane rating of the mixed gasoline delivered via the nozzle 23, such as by an improper gearing of the valves 17, 17' with the selector 33, the customer will still pay for only the amount of each octane gasoline received, for the cost of the mixture is mechanically computed from the individual meters 15, 15' and therefore he will not be cheated, although under these unusual conditions he will not have obtained exactly the octane asked for. On the other hand, since the money totalizers 71, 71' and the gallonage totalizers 75, 75' are of the accumulative type and are not returnable to their zero registrations without having obtained special access thereto, suitable locking means normally preventing any undesirable tampering with these totalizers 71, 71' and 75, 75', these totalizers will produce an accurate record for the benefit of the management.

In brief, provision has been made for the mixed dispensing of two liquids, such as gasolines having different octane ratings, in such a manner that mixing does not occur until the liquids have reached the mixing chamber 25 in the nozzle 23. Proper positioning of the valves 17, 17' by the selector 33 assures that the purchaser will receive exactly the combined quality that he has requested, in this instance, gasoline having a particular octane rating. Further, the invention makes provision for adjusting the various mechanisms to any particular price that might be charged for the various gasolines, either in independent or aggregate form, the price mechanisms being susceptible to ready change should different prices for the gasoline be charged from time to time. Still further, the apparatus above described provides for the registration of the cost of the combined gasoline without resort to tables or mental computation. Further, the exact quantity of mixed gasoline dispensed is also displayed for the information of the parties concerned. Also, if there should be any misalignment of the selector 33 with the valves 17, 17', the purchaser will still be charged only for the actual blend delivered to him.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In an apparatus for dispensing selected mixtures of two different liquids, a dispensing nozzle; means for supplying a selected proportion of one liquid to the nozzle comprising a first pump, a first meter, a first control valve, and interconnecting conduit means; means for supplying a selected proportion of a second liquid to the nozzle comprising a second pump, a second meter, a second control valve and interconnecting conduit means; manually settable means connected to the first and second control valves for varying the proportion of the two liquids dispensed; a single cost register for registering the combined cost of both liquids dispensed; a pair of variators driven respectively by the first and second meters for producing a variable drive proportional to the price of the liquid dispensed thrrough each meter; and differential gearing connecting the output shafts of the two variators to the single cost register.

2. In an apparatus for dispensing selected mixtures of two different liquids, a dispensing nozzle; means for supplying a selected proportion of one liquid to the nozzle comprising a first pump, a first meter, a first control valve and interconnecting conduit means; means for supplying a selected proportion of a second liquid to the nozzle comprising a second pump, a second meter, a second control valve and interconnecting conduit means; manually settable means connected to the first and second control valves for varying the proportion of the two liquids dispensed; a single quantity register for registering the combined amount of both liquids dispensed, differential gearing connecting the output shafts of the two meters to the single quantity register, a single cost register for registering the combined cost of both liquids dispensed; a pair of variators driven respectively by the first and second meters for producing a variable drive proportional to the price of the liquid dispensed through each meter; and differential gearing connecting the output shafts of the two variators to the single cost register.

3. In an apparatus for dispensing selected mixtures of two different liquids, a dispensing nozzle; means for supplying a selected proportion of one liquid to the nozzle comprising a first pump, a first meter, a first control valve, and interconnecting conduit means; means for supplying a selected proportion of a second liquid to the nozzle comprising a second pump, a second meter, a second control valve and interconnecting conduit means; manually settable means connected to the first and second control valves for varying the proportion of the two liquids dispensed; first indicating means associated with the manually settable means for indicating the proportion of liquids dispensed, a single cost register for registering the combined cost of both liquids dispensed; a pair of variators driven respectively by the first and second meters for producing a variable drive proportional to the price of the liquid dispensed through each meter; second indicating means associated with each variator for indicating setting of the variator in terms of the price per unit of the liquid dispensed through the meter associated with the variator, and differential gearing connecting the output shafts of the two variators to the single cost register.

4. In an apparatus for dispensing selected mixtures of two different liquids, a dispensing nozzle; means for supplying a selected proportion of one liquid to the nozzle comprising a first pump, a first meter, a first control valve, and interconnecting conduit means; means for supplying a selected proportion of a second liquid to the nozzle comprising a second pump, a second meter, a second control valve and interconnecting conduit means; manually settable means connected to the first and second control valves for varying the proportion of the two liquids dispensed; first indicating means associated with the manually settable means for indicating the proportion of liquids dispensed, a single quantity register for registering the combined amount of both liquids dispensed, differential gearing connecting the output shafts of the two meters to the single quantity register, a single cost register for registering the combined cost of both liquids dispensed; a pair of variators driven respectively by the first and second meters for producing a variable drive proportional to the price of the liquid dispensed through each meter; second indicating means associated with each variator for indicating setting of the variator in terms of the price per unit of the liquid dispensed through the meter associated with the variator, and differential gearing connecting the output shafts of the two variators to the single cost register, said quantity register, cost register, first indicating means and second indicating means being disposed in closely spaced relationship in a single panel for simultaneous viewing by the operator.

5. In an apparatus for dispensing selected mixtures of two different liquids; means for supplying a selected proportion of one liquid including a first pump, a first meter, a first control valve and a first output conduit; means for supplying a selected proportion of a second liquid comprising a second pump, a second meter, a second control valve and a second output conduit; manually settable means connected to the first and second control valves for varying the proportion of the two liquids dispensed; and a dispensing nozzle connected to the first and second output conduits having a manually operable main valve for controlling the output of the nozzle, and an internally mounted one way valve associated with each conduit for preventing reverse flow through the conduit.

6. In an apparatus for dispensing selected mixtures of two different liquids; a dispensing nozzle; means for supplying a selected proportion of one liquid to the nozzle comprising a first pump, a first meter, a first control valve and interconnecting conduit means; means for supplying a selected proportion of a second liquid to the nozzle comprising a second pump, a second meter, a second control valve and interconnecting conduit means; a manually operable control member connected to the first and second control valve for simultaneously operating the valves to vary the proportion of liquids dispensed; first indicator means associated with the control member for indicating the relative setting of the valves; and manually adjustable second indicator means associated with the first indicator means for indicating the price per unit of the mixture of liquids dispensed at various settings of the control member.

7. The apparatus defined in claim 6 wherein the first indicator means is a main dial connected to the control member, and the second indicator means are a plurality of secondary dials mounted on the main dial.

References Cited in the file of this patent
UNITED STATES PATENTS

| 1,964,028 | Boynton et al. | June 26, 1934 |
| 1,985,918 | De Lancey | Jan. 1, 1935 |
| 2,033,255 | Riney et al. | Mar. 10, 1936 |
| 2,057,226 | Bleecker | Oct. 13, 1936 |
| 2,264,557 | Slye | Dec. 2, 1941 |
| 2,414,842 | Trexler | Jan. 28, 1947 |